M. TALIANI.
APPARATUS FOR THE CATALYTIC OXIDATION OF AMMONIA.
APPLICATION FILED APR. 26, 1918.
1,270,989.
Patented July 2, 1918.
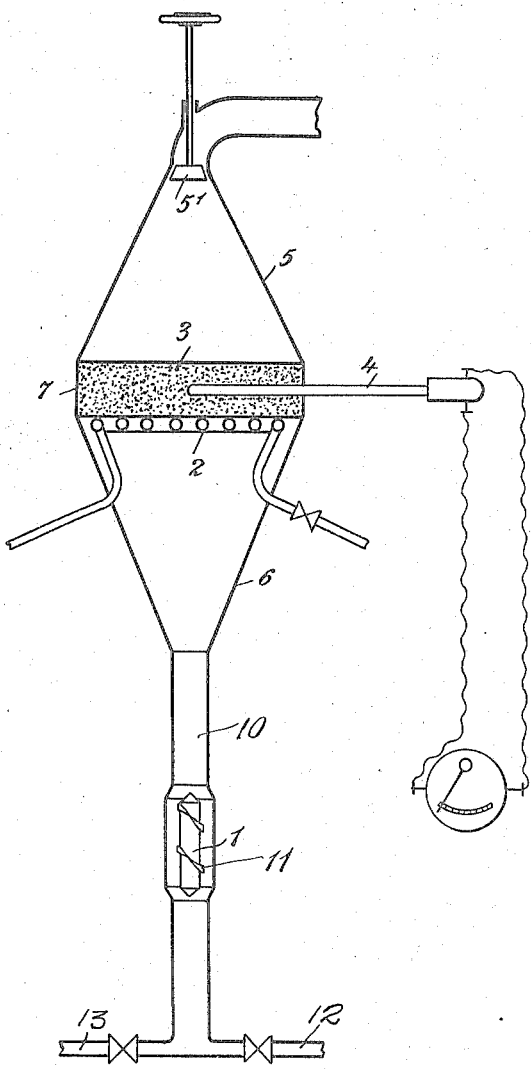
Inventor
M. Taliani.
By H. R. Kerslake
Atty.

UNITED STATES PATENT OFFICE.

MICHELE TALIANI, OF ISOLA LIRI, ITALY.

APPARATUS FOR THE CATALYTIC OXIDATION OF AMMONIA.

1,270,989.　　　　　Specification of Letters Patent.　　Patented July 2, 1918.

Application filed April 26, 1918. Serial No. 230,997.

*To all whom it may concern:*

Be it known that I, MICHELE TALIANI, a subject of the King of Italy, and chemist, a subject of the King of Italy, and residing at Isola Liri, Caserta, Italy, (whose post-office address is Polverificio Isola del Liri,) have invented certain new and useful Improvements in or Relating to Apparatus for the Catalytic Oxidation of Ammonia, of which the following is a specification.

My invention relates to improvements in apparatus for oxidizing ammonia and has for its main object to provide a novel apparatus in which the process of oxidizing ammonia can be carried out with better results than with the apparatus heretofore known.

Another object of the invention is to provide in an apparatus of this character, improved mechanism for whirling and thoroughly mixing the air and ammonia before they enter the catalytic chamber.

A further object is to provide a catalytic chamber in which the mixed air and ammonia will be diffused over the entire surface of the catalytic mass.

With the foregoing objects outlined and with other objects in view, which will appear as the description proceeds, the invention consists in the novel features hereinafter described in detail, in connection with the accompanying drawing.

The drawing shows a diagrammatic sectional view of the apparatus.

The catalytic chamber consists of two funnel-shaped sections 5 and 6, which are joined at their large ends by means of a ring or collar 7. Located at the large end of the section 6 is a tubular coil through which circulates a cooling agent, such as water. The coil 2 supports within the ring 7, the catalytic mass 3, which is preferably formed of broken porcelain coated, by a chemical process, with metallic platinum. An inlet pipe 10 for the air and ammonia is connected to the small end of the funnel-shaped section 6, and located within this pipe is a member 1 having spiral thread 11, which is adapted, as the air and ammonia pass the same, to impart a whirling motion to the fluids, so that the same will be intimately mixed and spread in order to uniformly be distributed over the catalytic mass 3. Air is admitted to the apparatus through a pipe 12 and ammonia is admitted through a pipe 13.

An outlet pipe 14 is connected to the small end of the section 5 to permit the exit of the nitrose gases generated within the chamber and a valve $5^1$ is provided in the outlet of the section 5 to control the pressure within the apparatus.

A pyrometer 4 is arranged, as shown in the drawing, to indicate the temperature of the catalytic mass.

The catalytic mass 3 may be heated by any suitable means and the temperature of the same is preferably maintained at about 700°, which is preferable temperature for the chemical reaction.

The ammonia and air passing through the apparatus is transformed into nitrose gas, which when suitably treated in an oxidizing and absorbing apparatus, produces nitric acid.

In operating the apparatus, the catalytic mass 3 is first heated to the required degree and the air and ammonia is then admitted to the apparatus. As the fluids pass the member 1—11, they are whirled and intimately mixed, and caused to spread in the section 6, so as to be uniformly distributed over the catalytic mass. Upon the mixture reaching the section 6 it will spread out and first contact with the cooling coils 2 and then pass into the catalytic mass 3. As soon as the reaction is started, it proceeds spontaneously with generation of heat, and this heat is regulated to maintain the temperature in the apparatus at about 700°.

The pressure within the apparatus is maintained or regulated by the valve $5^1$.

I am aware that various changes may be made in the construction of the apparatus without departing from the spirit of the invention, or sacrificing any of its advantages.

What I claim and desire to secure by Letters Patent is:—

1. In an apparatus for the catalytic oxidation of ammonia, a chamber containing a catalytic mass, means for admitting air and ammonia to said chamber, and means for mixing said air and ammonia and imparting a whirling motion thereto, whereby said air and gas will be intimately mixed and uniformly distributed over the catalytic mass.

2. In an apparatus for the catalytic oxidation of ammonia, a chamber comprising two funnel-shaped sections connected together at their large ends, a cooling coil located at the large ends of said sections, and a catalytic mass supported by said coil.

3. In an apparatus for the catalytic oxidation of ammonia, a chamber comprising two funnel-shaped sections connected together at their large ends, a catalytic mass located at the large ends of said sections, means for admitting air and ammonia to the small end of one of said sections, and means for imparting a whirling motion to the air and ammonia, whereby the same will be intimately mixed and spread in the last named section and uniformly distributed over the catalytic mass.

4. An apparatus for the catalytic oxidation of ammonia comprising a chamber consisting of two funnel-shaped sections connected together at their large ends by a ring, a cooling coil located in the large end of one section and supporting a catalytic mass within the ring, a pipe for admitting air and ammonia to the smaller end of one section, means for imparting a whirling motion to the incoming air and ammonia so as to spread the same in the chamber and uniformly distribute the air and ammonia over the catalytic mass, and a pressure valve for controlling the pressure in the chamber.

In testimony whereof I have hereunto signed my name in the presence of two witnesses.

Dr. MICHELE TALIANI.

Witnesses:
GIOVANNI BORTOLUZZI,
ADOLFO P. LOCOLO.